United States Patent
Stefan et al.

(10) Patent No.: US 9,514,646 B2
(45) Date of Patent: Dec. 6, 2016

(54) METHOD FOR ASSISTING VEHICLE PARKING USING SENSORS ON BOTH A PARKING VEHICLE AND A PARKED VEHICLE

(71) Applicant: FORD GLOBAL TECHNOLOGIES, LLC, Dearborn, MI (US)

(72) Inventors: Frederic Stefan, Aachen (DE); Christoph Arndt, Moerlen (DE); Uwe Gussen, Huertgenwald (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/924,337

(22) Filed: Oct. 27, 2015

(65) Prior Publication Data

US 2016/0117927 A1    Apr. 28, 2016

(30) Foreign Application Priority Data

Oct. 27, 2014 (DE) ........................ 10 2014 221 850

(51) Int. Cl.
*G08B 21/00* (2006.01)
*G08G 1/16* (2006.01)
(Continued)

(52) U.S. Cl.
CPC .............. *G08G 1/161* (2013.01); *B60W 30/06* (2013.01); *G06K 9/00791* (2013.01);
(Continued)

(58) Field of Classification Search
CPC ..................................................... G08G 1/161
(Continued)

(56) References Cited

U.S. PATENT DOCUMENTS

2005/0035879 A1  2/2005 Gotzig et al.
2012/0200430 A1  8/2012 Spahl

FOREIGN PATENT DOCUMENTS

DE    102010029419 A1    12/2010
DE    102009039086 A1    3/2011
(Continued)

OTHER PUBLICATIONS

German Patent and Trademark Office, Examination Report for the corresponding German Patent Application No. 10 2014 221 851.9 dated Aug. 7, 2015.

*Primary Examiner* — Jeffery Hofsass
(74) *Attorney, Agent, or Firm* — Frank A. MacKenzie; Brooks Kushman P.C.

(57) ABSTRACT

A method of operating a parking assistance system involves operating a first sensor onboard a parking vehicle to obtain a first distance measurement to a parked vehicle, and transmitting a first wireless signal which activates a second sensor onboard the parked vehicle. The second sensor obtains a second distance measurement to the parking vehicle and transmits the result via a second wireless signal. The second wireless signal is received by the parking vehicle which then determines an inter-vehicle distance based on the first and second distance measurements, and uses the inter-vehicle distance to perform a parking maneuver. The transmission of the second distance measurement by the parked vehicle may be contingent upon existence of a condition (such as a sufficient state-or-charge of a vehicle battery or prior consent of an operator) of the parked vehicle when the parked vehicle receives the first wireless signal.

18 Claims, 5 Drawing Sheets

(51) Int. Cl.
*B60W 30/06* (2006.01)
*G06K 9/00* (2006.01)
*G08G 1/14* (2006.01)
*H04W 84/18* (2009.01)

(52) U.S. Cl.
CPC ......... *G06K 9/00812* (2013.01); *G08G 1/143* (2013.01); *G08G 1/168* (2013.01); *H04W 84/18* (2013.01)

(58) Field of Classification Search
USPC ...... 340/932.2, 933, 435; 180/199; 701/301; 414/227
See application file for complete search history.

(56) References Cited

FOREIGN PATENT DOCUMENTS

| | | |
|---|---|---|
| EP | 2623398 A1 | 8/2013 |
| WO | 20130272127 A1 | 5/2013 |

METHOD FOR ASSISTING VEHICLE PARKING USING SENSORS ON BOTH A PARKING VEHICLE AND A PARKED VEHICLE

CROSS-REFERENCE TO RELATED APPLICATIONS

This application claims foreign priority benefits under 35 U.S.C. §119(a)-(d) to DE 10 2014 221 850.0 filed Oct. 27, 2014, which is hereby incorporated by reference in its entirety.

TECHNICAL FIELD

The invention relates to a method for operating an electronic system to assist a parking process.

BACKGROUND

Conventional parking sensor systems generally employ ultrasonic proximity sensors, wherein up to twelve or more sensors can typically be arranged around the respective vehicle. In order to avoid disruptive interference and echo-effects, these sensors each emit an ultrasonic pulse sequentially, wherein in each case the other sensors record the echo signals. In this context, each of the sensors can be used with a period of e.g. 200 ms. The distance from an object located in the vicinity (typically up to a maximum distance in the range of from to 2 meters to 4 meters) is then estimated on the basis of signal processing algorithms. If a plurality of echo signals is necessary to identify an object and to estimate a distance thereto, the time resolution and spatial resolution which can be achieved with such ultrasonic-based parking sensors is very limited.

EP 2 623 398 A1 discloses, inter alia, a method for defining a target position of a vehicle in a parking space and a driver assistance system, it being possible to determine two-dimensional and three-dimensional surroundings parameters of the parking space, and the provisional target position of the vehicle in the parking space being corrected on the basis of the three-dimensional surroundings parameters, for example taking into account at least one distance information item.

EP 1 495 344 B1 discloses, inter alia, a parking aid system and a method for operating same, the length and/or width of the parking space being determined from the values of sensors measured while the vehicle travels past a parking space, and the measurement being carried out at different time intervals by means of a distance sensor.

DE 10 2011 086 245 A1 discloses, inter alia, a method for assisting a driver during a parking maneuver, possible trajectories along which the vehicle can be guided into a space during a parking maneuver being determined after the sensing of the surroundings of the vehicle, for example using distance sensors, and the space being output as a parking space to the driver if the vehicle remains within predefined limits during the entire parking maneuver.

SUMMARY

In one disclosed embodiment, a parking assistance method comprises operating a first sensor onboard a parking vehicle to obtain a first distance measurement to a parked vehicle, transmitting a first wireless signal activating a second sensor onboard the parked vehicle, receiving a second wireless signal from the parked vehicle communicating a second distance measurement obtained from the second sensor, and determining an inter-vehicle distance based on the first and second distance measurements.

The disclosed method increases the accuracy of a parking assistance system employing one or more distance sensors (for example ultrasonic sensors) by an interaction between the sensor or sensors of the vehicle which is carrying out the parking process and one or more sensors of a parked vehicle. This interaction is brought about by a coordinated communication between the two vehicles. This communication can take place by way of, for example, a wireless radiofrequency (RF) link (such as Bluetooth, near field communication, or a "Cloud" applications.

As a result, in this way the measuring and scanning accuracy of the distance measurements which have to be performed on the part of the vehicle which is carrying out the parking process is increased.

In another disclosed embodiment, a parking assistance method comprises determining an inter-vehicle distance onboard a parking vehicle using a first distance measurement from a first sensor onboard the parking vehicle in combination with a second distance measurement from a second distance measurement made by a second sensor onboard a parked vehicle, the second distance measurement transmitted from the parked vehicle to the parking vehicle by wireless communication.

In another disclosed embodiment, a parking assistance method comprises, in response to a first wireless signal received from a parking vehicle, operating a first sensor onboard a parked vehicle to obtain a first distance measurement to the parking vehicle, and transmitting a second wireless signal from the parked vehicle to the parking vehicle containing the first distance measurement, the parking vehicle determining an inter-vehicle distance using the first distance measurement and a second distance measurement from a second sensor onboard the parking vehicle According to one embodiment, transmission of the second distance measurement by the parked vehicle is contingent upon existence of a condition of the parked vehicle when the parked vehicle receives the first wireless signal.

According to one embodiment, the condition comprises an operator of the parked vehicle previously consenting to activation of the second sensor by a wireless signal.

According to one embodiment, the condition comprises presence of a predefined minimum state of charge of a battery of the parked vehicle.

The invention will be explained in more detail below by means of an exemplary embodiment which is illustrated in the appended figures.

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The disclosed system/method uses, in addition to the parking/distance sensors (for example ultrasound-based proximity sensors) present on a parking vehicle (the "parking vehicle" being one which is looking for an available parking space and/or subsequently carrying out a parking process to enter the available parking space), additional sensor information obtained from a nearby parked vehicle, to improve the accuracy of a parking assistance system. The disclosed system/method can also be used when entering a multi-story parking structure in order to avoid damage to the vehicle as a result of scratches or the like, or also to optimize the utilization of the parking spaces by reducing the gaps or spaces between parked vehicles.

The parking assistance method/system may be activated by, for example, the driver of the parking vehicle consciously activating (by a manual switch/button or voice actuation, for example) the parking assistance system. In addition or alternatively, the parking assistance method/system may be activated when the vehicle moves forward at a speed below a given limiting value. Once the method/system is activated, the phase of searching for a suitable parking space begins. For this purpose, a parking assistance device according to the prior art would conventionally sense the surroundings of the vehicle using only the lateral parking sensors of the parking vehicle.

The disclosed parking assistance system additionally activates at least one parking sensor of a parked vehicle (or a plurality of parked vehicles) located in the vicinity, in particular the closest parked vehicle to the parking vehicle. This activation is accomplished by transmitting a wireless signal from the parking vehicle that is received by the parked vehicle. The parking assistance system of the parking vehicle then receives distance-sensing information from the sensor (or sensors) of the parked vehicle (transmitted from the parked vehicle and received by the parking vehicle) and logically links this received information to the distance-sensing information obtained from its own parking sensors.

Figure 1:
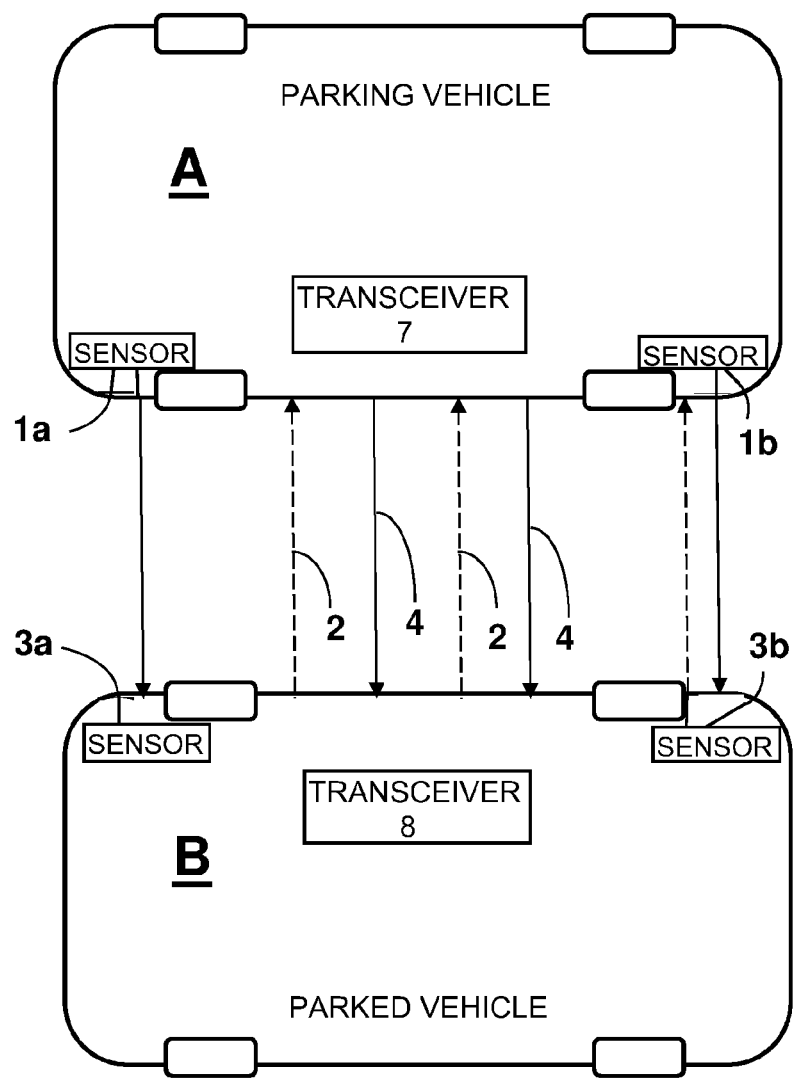
FIG. 1 is a schematic illustration of a sensor layout, used within the scope of an embodiment of the invention.

In the example it is assumed that a first motor vehicle denoted by A in FIG. 1 is the parking vehicle (it is searching for a suitable parking space using its parking sensors 1) and traveling at a low vehicle speed appropriate for a parking situation, for example at or below approximately 10 km/h (corresponding to 2.8 m/s).

For example it is assumed that at least one of the sensors 1a, 1b of the vehicle A carries out a distance measurement by transmitting ultrasonic signals, for example at time intervals of 200 ms. The vehicle A receives corresponding echo signals 2, indicating an inter-vehicle distance of, for example, approximately 0.5 m. If the vehicle A moves alongside a parked vehicle denoted by B, a communication or exchange of data is initiated by means of wireless transceivers 7, 8 onboard the vehicles A and B respectively. In particular, vehicle A first sends a signal (from transceiver 7) to vehicle B (received by transceiver 8) which triggers or activates by remote control one or more of the sensors 3a, 3b of the parked vehicle B. These sensors 3a, 3b, in a manner similar to sensors 1a, 1b, transmit ultrasonic signals and measure echo signals 4, for example at similar time intervals to the echo signals 2.

Vehicle B then transmits a signal back to vehicle A which contains or provides the distance information obtained by sensors 3a, 3b. Given knowledge of the position of the sensors 3a, 3b of the parked vehicle B and on the basis of the distance to vehicle A measured by these sensors 3a, 3b, it is now possible for the parking assistance system of vehicle A to use this additional distance information to improve the accuracy of the parking method being carried out. The process described above can be carried out during the entire parking maneuver and used to estimate the space or distance remaining, during the parking maneuver, behind the vehicle A which is carrying out the parking process.

In the text which follows, an exemplary sequence of a method according to the invention is described with reference to the flowchart shown in FIG. 2, with "A" again denoting a parking vehicle and "B" denoting a parked vehicle (the engine or ignition of which is likely to be switched off). In this context, in particular a possible identification of the vehicle B by the vehicle A, the remote-controlled activation of the sensors of the vehicle B by the vehicle A, and the possible logic linking of the sensors are described.

Figure 2:
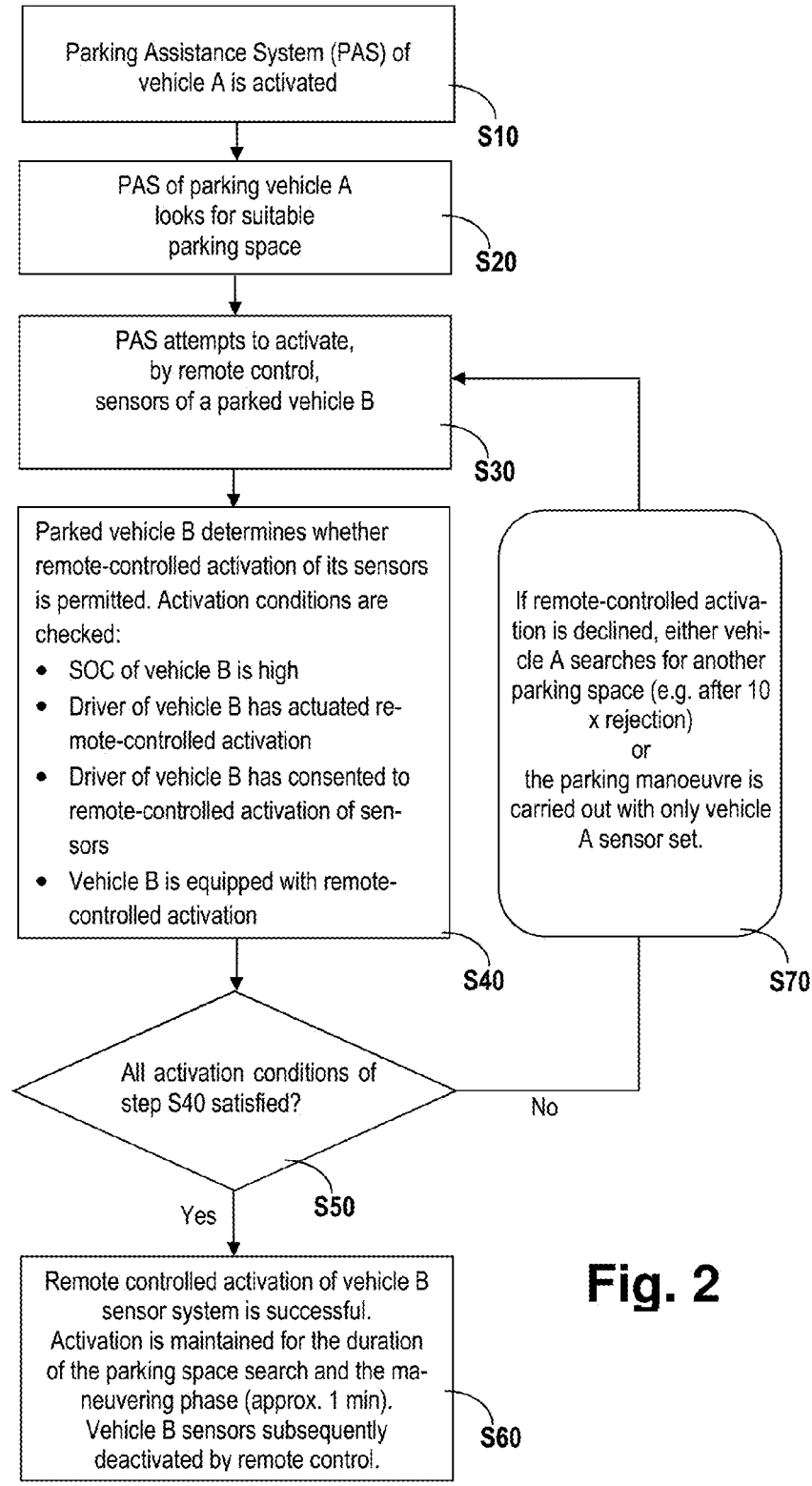
FIG. 2 is a flowchart explaining an exemplary sequence of a disclosed method.

According to FIG. 2, the activation of the parking assistance device of the parking vehicle A takes place first in a step S10. Thereafter, in step S20, the parking assistance device of the vehicle A looks for a suitable parking space using its own onboard distance sensors. Then, in step S30, the parking assistance device attempts to activate by remote control (by transmitting, for example, a wireless RF signal) the sensors of the closest identified parked vehicle B.

In step S40, it is determined on the part of the parked vehicle B whether remote-controlled activation of its sensors is permitted. In this context, it is possible to check in particular whether the following activation conditions are satisfied: "State of charge (SOC) of a battery of the vehicle B is high, " "Driver of vehicle B has enabled the remote-controlled activation," "Driver of the vehicle B has consented to remote-controlled activation of the sensors," and "Vehicle B is equipped with functionality for the remote-controlled activation".

In step S50, there is then an interrogation as to whether the conditions checked in step S40 are satisfied (are "true"). If this is the case, the remote-controlled activation of the sensor or sensors of the vehicle B is successful. The activation of vehicle B's sensor(s) is maintained for the duration of vehicle A's searching for the parking space, and also during the phase of the parking maneuver (which can have, for example, a duration of 1 minute). The activation of vehicle B's sensor(s) is subsequently deactivated again in the step S60 by a remote control communication from the vehicle A. Otherwise, i.e. if not all of the conditions checked in step S40 are satisfied according to the interrogation in step S50, in step S70 either another parking space is sought (for example after ten-fold negative checking) or the parking maneuver is carried out using only the distance sensors on vehicle A.

Figure 3:
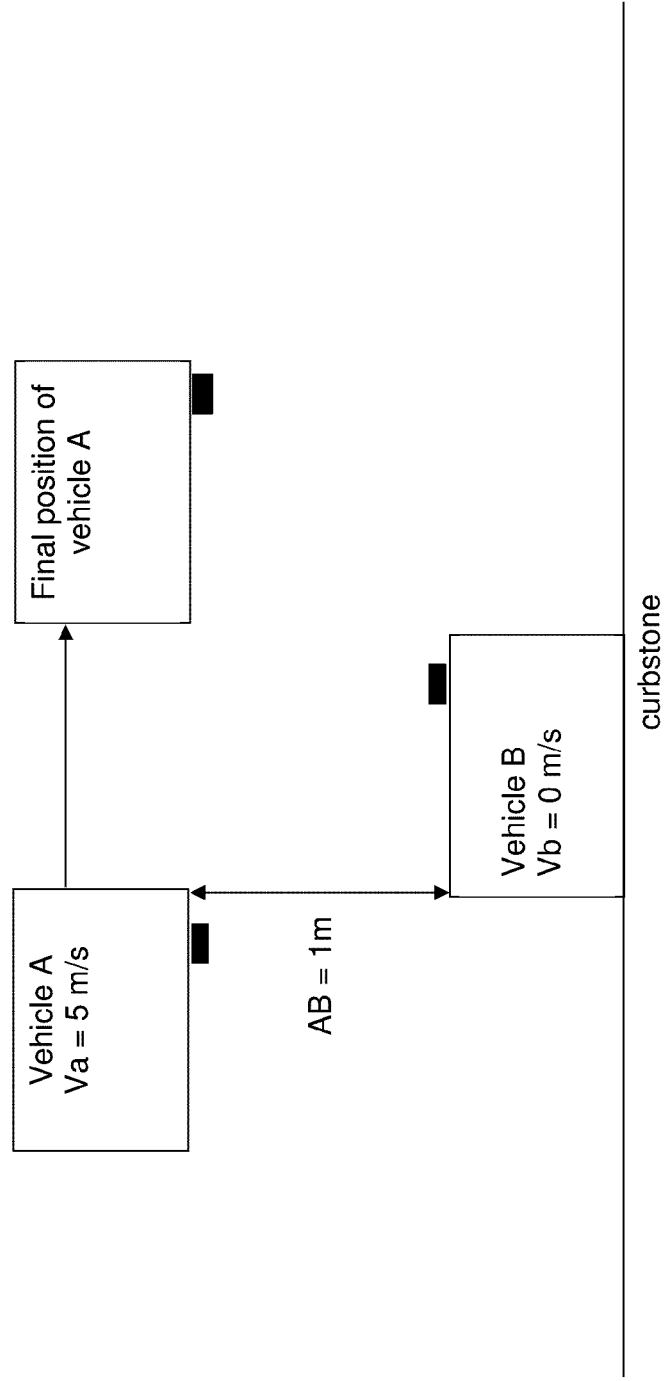
FIG. 3 is a schematic illustration of a portion of a parking maneuver using the disclosed method.

In the text which follows, for the sake of simplicity it is assumed that each of the vehicles A and B has merely a single sensor, as is illustrated schematically in FIG. 3. Each of these sensors transmits an ultrasonic signal having an identifier and with a time period of 200 ms. The propagation time of the signal between the two vehicles A and B (which can typically be 0.06 s, for example) is ignored. During the sensing maneuver the vehicle A covers a distance of 5 meters until it reaches its final position in the example.

It is assumed that the respective sensor of vehicle A and of vehicle B is located on or closely adjacent to the forward end of its respective vehicle, with the result that, when the vehicle A overtakes the vehicle B, the sensor of the vehicle A "does not see anything" (because the sensor only detects objects directly laterally abeam of vehicle A) even though vehicle B still represents a lateral obstacle. The distance measurement of the sensors yields, for example, approximately 1 meter when an object or "target" is sensed by the sensor in question, and 4 meters if no object or target is sensed by the sensor in question (the latter distance corresponding, in the present example, to the maximum distance measureable by conventional ultrasonic sensors).

As soon as the parking assistance device has been activated, the parking vehicle A requests (by means of a wireless transmission, as described above) the corresponding information from the parking sensors of the parked vehicle B. In the present example, this can take place at intervals of 200 ms and phase shifted by 100 ms, in order to activate the parking sensors of the vehicle A.

Figure 4:
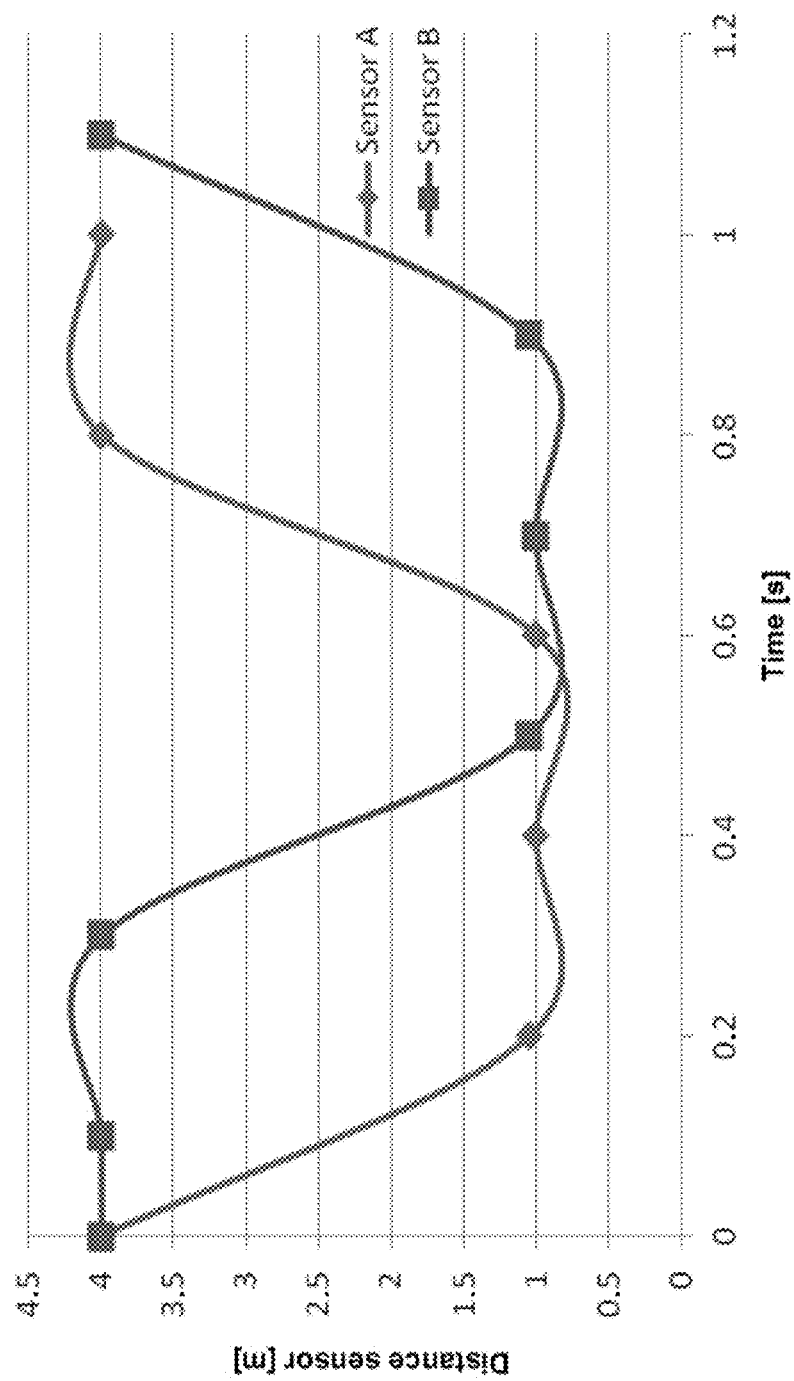
FIG. 4 is a graph showing plots of measured distance versus time for sensors onboard a parking vehicle and a parked vehicle.

In the diagram in FIG. 4, the distance estimations which are supplied by way of example by the respective sensors of the vehicles A, B are illustrated as a function of time. Logic linking of the measurements of the two sensors of the vehicles A, B can be implemented, for example by determining, according to FIG. 5, the minimum of the measurements carried out by both sensors and using it for the distance estimation.

Figure 5:
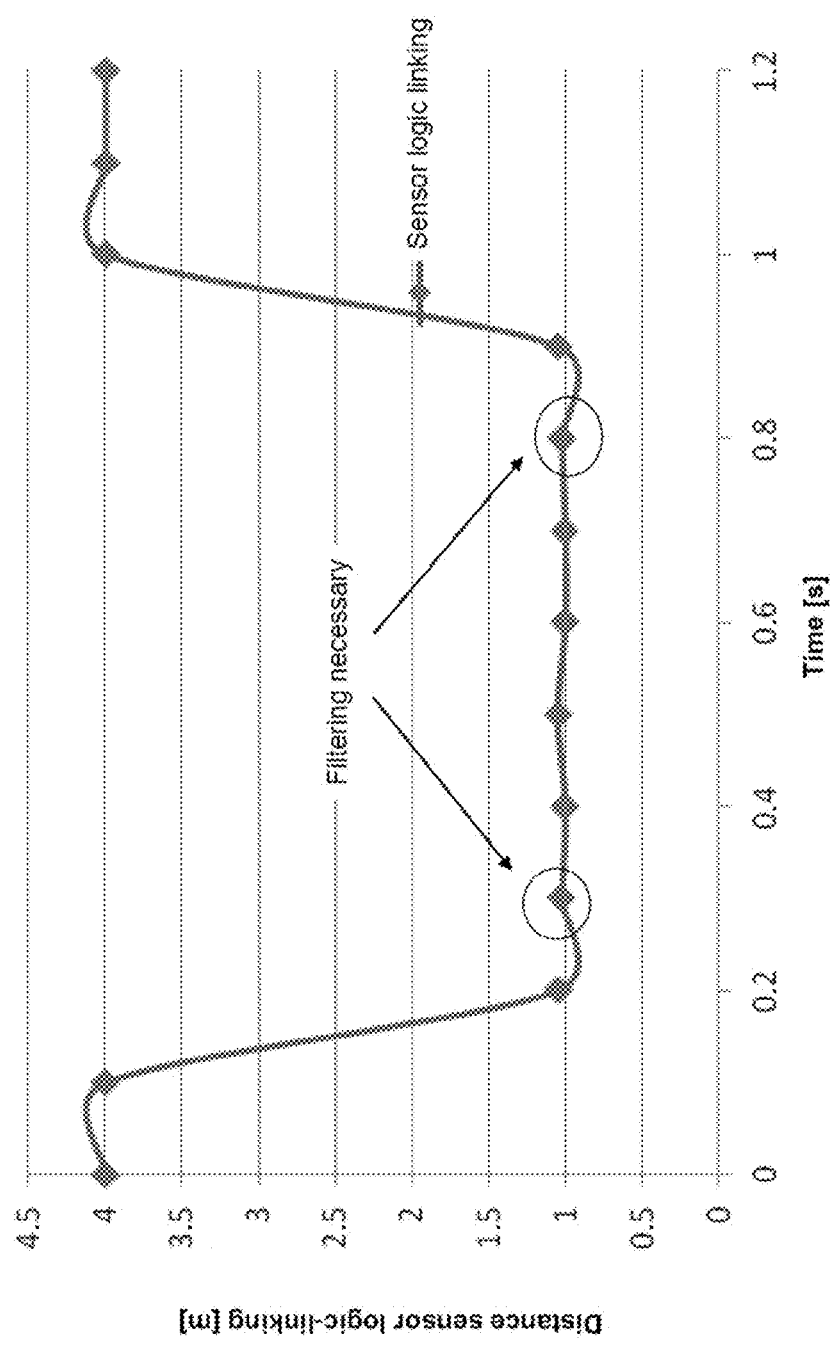
FIG. 5 is a graph showing a logic-linking of the distance measurements of FIG. 4.

Furthermore, in addition a suitable filter method (for example by means of interpolation) can be carried out in order to eliminate local maximum values, such as in the general manner indicated in FIG. 5.

While the invention is suitable in particular for more precise identification of the quality of a prospective parking space (for example by determining whether it is a parking space for parallel or perpendicular parking or some other parking space), the invention is also suitable for more precise tracking of a specific trajectory during the maneuvering into a parking space.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A parking assistance method comprising:
   operating a first sensor onboard a parking vehicle to obtain a first distance measurement to a parked vehicle;
   transmitting a first wireless signal activating a second sensor onboard the parked vehicle;
   receiving a second wireless signal from the parked vehicle communicating a second distance measurement obtained from the second sensor; and
   determining an inter-vehicle distance based on the first and second distance measurements.

2. The method of claim 1, wherein transmission of the second distance measurement by the parked vehicle is contingent upon existence of a condition of the parked vehicle when the parked vehicle receives the first wireless signal.

3. The method of claim 2, wherein the condition comprises an operator of the parked vehicle previously consenting to activation of the second sensor by a wireless signal.

4. The method of claim 2, wherein the condition comprises presence of a predefined minimum state of charge of a battery of the parked vehicle.

5. The method of claim 2, wherein if the condition does not exist, the parking vehicle determines the inter-vehicle distance based on only the first distance measurement.

6. The method of claim 1, wherein the step of determining an inter-vehicle distance comprises using a minimum value of the first distance measurement and the second distance measurement.

7. A parking assistance method comprising:
   determining an inter-vehicle distance onboard a parking vehicle using a first distance measurement from a first sensor onboard the parking vehicle in combination with a second distance measurement from a second distance measurement made by a second sensor onboard a parked vehicle, the second distance measurement transmitted from the parked vehicle to the parking vehicle by wireless communication.

8. The method of claim 7, wherein transmission of the second distance measurement by the parked vehicle is contingent upon existence of a condition of the parked vehicle.

9. The method of claim 8, wherein the condition comprises an operator of the parked vehicle previously consenting to activation of the second sensor by a wireless signal transmitted from the parking vehicle.

10. The method of claim 8, wherein the condition comprises presence of a predefined minimum state of charge of a battery of the parked vehicle.

11. The method of claim 8, wherein if the condition does not exist, the parking vehicle determines the inter-vehicle distance based on only the first distance measurement.

12. The method of claim 7, wherein the inter-vehicle distance is determined to be a minimum value of the first distance measurement and the second distance measurement.

13. A parking assistance method comprising:
   in response to a first wireless signal received from a parking vehicle, operating a first sensor onboard a parked vehicle to obtain a first distance measurement to the parking vehicle; and
   transmitting a second wireless signal from the parked vehicle to the parking vehicle containing the first distance measurement, the parking vehicle determining an inter-vehicle distance using the first distance measurement and a second distance measurement from a second sensor onboard the parking vehicle.

14. The method of claim 13, wherein transmission of the second distance measurement by the parked vehicle is contingent upon existence of a condition of the parked vehicle when the parked vehicle receives the first wireless signal.

15. The method of claim 14, wherein the condition comprises an operator of the parked vehicle previously consenting to activation of the second sensor by a wireless signal.

16. The method of claim 14, wherein the condition comprises presence of a predefined minimum state of charge of a battery of the parked vehicle.

17. The method of claim 14, wherein if the condition does not exist, the parking vehicle determines the inter-vehicle distance based on only the first distance measurement.

18. The method of claim 13, wherein the inter-vehicle distance is determined to be a minimum value of the first distance measurement and the second distance measurement.

* * * * *